United States Patent [19]
Dockrell

[11] Patent Number: 4,971,604
[45] Date of Patent: Nov. 20, 1990

[54] DEGASSIFICATION ELBOW

[75] Inventor: Mark B. Dockrell, Clearwater, Canada

[73] Assignee: Fiberglas Canada Inc., Point Edward, Canada

[21] Appl. No.: 307,520

[22] Filed: Feb. 8, 1989

[51] Int. Cl.$^5$ ............................................. B01D 45/12
[52] U.S. Cl. ........................................... 55/1; 55/461
[58] Field of Search ....................... 55/461, 1; 209/143

[56] References Cited
U.S. PATENT DOCUMENTS
3,864,106  2/1975  Brandt .................................. 55/461

FOREIGN PATENT DOCUMENTS
8959    11/1905  Denmark ............................... 55/461
1088435  3/1955  France .................................. 55/461

Primary Examiner—Bernard Nozick
Attorney, Agent, or Firm—Dennison, Meserole, Pollack & Scheiner

[57] ABSTRACT

A degassification elbow comprises a flow conduit which has an inner wall, an outer wall, and a plurality of openings. Two of the openings are formed by the walls of the flow conduit and at least one of the openings is in the inner wall of the flow conduit and is disposed between two of the openings. A process for use in association with the degassification elbow is also disclosed.

11 Claims, 1 Drawing Sheet

DEGASSIFICATION ELBOW

BACKGROUND OF THE INVENTION

1. Field of the Invention

This invention relates to particle separators and more particularly to degassification apparatus and process.

More specifically, this invention relates to degassification elbows and processes for their use, and more specifically, to a degassification elbow for use in separating air from mixtures which are comprised substantially of air and mineral fibers.

2. Description of Related Art

Cyclone separators and conduits having an elbow structure and used for separating components of a mixture traveling therethough are known. However, such elbows achieve that result by a reduction in the velocity of the mixture by using an increased cross section of the conduit, employing differences in the gravitational force on the components of the mixture, with the result of removal of heavier elements of the mixture from the outer walls of such devices. As an alternative, baffle plates have been employed.

As well, cyclone separators and screen separators often produce inconsistent rates of fiber flow.

SUMMARY OF THE INVENTION

In contrast, the present invention seeks to achieve removal of some of the fluid component, for example some air, of a solid-fluid mixture of air and mineral fibers, by using differences in the momentum of the components of the mixture, and to achieve the continued transport of the remaining mixture.

Accordingly, in the present invention there is provided a degassification elbow for separating a fluid component from a solid-fluid mixture, said elbow comprising a curved flow conduit having an input portal and an output portal at opposite ends thereof, and an exhaust portal disposed in the inner wall of said conduit between said input and output portals, the arrangement being such that, on passage of said solid-fluid mixture through said conduit from the input to the output portal thereof, a substantially fluid portion of said mixture can be removed through said exhaust portal.

According to the present invention there is also provided a process for removing a fluid from a solid-fluid mixture, by passing the mixture through a degassification elbow comprising the steps of establishing a pressure gradient in said flow conduit as between a higher pressure near said outer will of said flow conduit and a lower pressure near said inner wall of said flow conduit in the region of said exhaust portal, introducing said mixture into said input portal of said conduit, converying said mixture through said flow conduit from said input portal to said output portal past said exhaust portal such that the different velocities of the fluid and solid result in an increased concentration of solids in the portion of said mixture near said outer wall, removing a portion of said mixture that substantially comprises fluid through said exhaust portal, and conveying the remainder of said mixture through the remainder of said flow conduit and through said output portal.

BRIEF DESCRIPTION OF THE DRAWING

Embodiments of the present invention will now be described with reference to accompanying drawing, in which.

DESCRIPTION OF PREFERRED EMBODIMENTS

Figure 1:
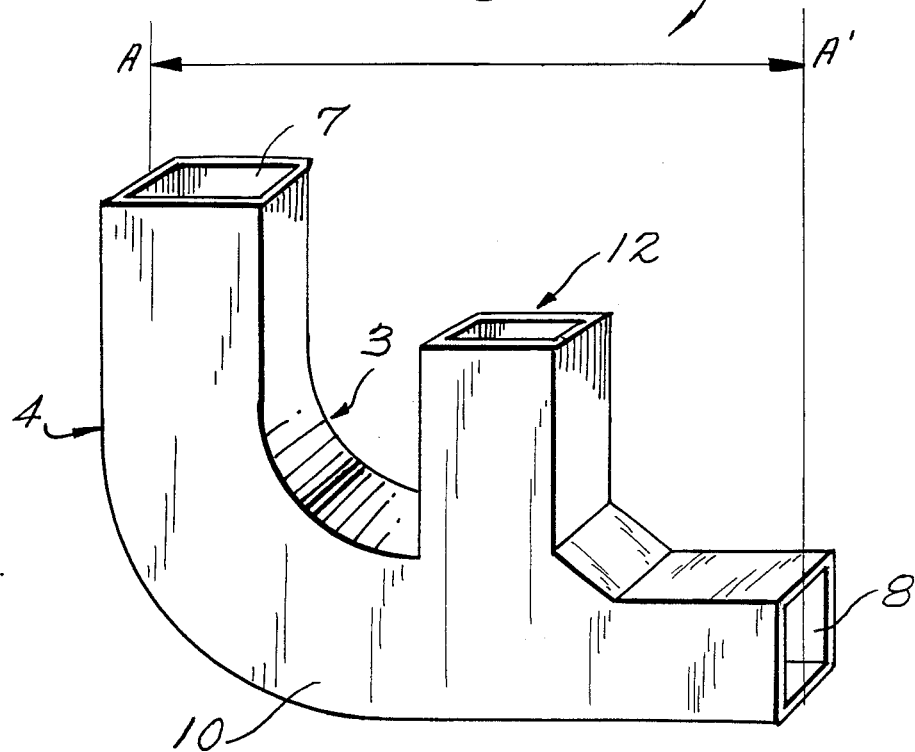
FIG. 1 is a perspective view of one embodiment and
FIG. 2 is a cross-sectional view of the embodiment of FIG. 1 along the line between "A" and "A'" in FIG. 1

The degassification elbow 1 comprises a flow conduit 2 having an inner wall 3, and outer wall 4, and a plurality of opening, two of which openings are formed by the walls 3 and 4 of the flow conduit 2. At least one of the openings extend from the inner surface 5 of the inner wall 3 of the flow conduit 2 to the outer surface 6 of said inner wall 3 of the flow conduit 2 and is disposed between two of said openings.

The degassification elbow 1 may be contructed of, for example, plastic or metal.

The openings include an input portal 7, an output portal 8 and an exhaust portal 9. The inner wall 3 of the flow conduit 2 and the outer wall 4 of the flow conduit 2 may join one another directly or there may be one or more further walls 10 which connect the outer wall 4 of the flow conduit 2 to the inner wall 3 of the flow conduit 2.

The inner surfaces 5, 5', 11 and 11' 1 of each of the walls 3 and 4 of the flow conduit 2 are curved or arcuate. Their lengths and curvatures, or arcs and radii, are selected so as to result in increased concentration of the solids in the portion of the mixture near inner surface 11 and 11' 1 of the outer wall 4 but not so large that frictional force result in particles of the solid component of the mixture collecting and compressing at any given location in the flow conduit 2. Specifically, excessively large radii for the inner surfaces 5, and 11 of the degassification elbow 1 allow a longer time for aerodynamic drag forces to act on mineral fibers and to accelerate them in the direction of the exhaust portal 9. On the other hand, excessively small radii for those inner surfaces results in the mineral fibers bouncing off of the inner surface of, for example, the outer wall, and thence into the airstream that is going through the exhaust portal 9. As well, excessively small radii for those inner surfaces creates excessive turbulence in the airstream in the degassification elbow 1, and hence produces small pockets of air which cause very high aerodynamic drag forces. Although there is always a small percentage of mineral fibers which are carried by the airstream through the exhaust portal, the above-described aerodynamic drag forces are, as indicated above, accentuated by excessively large or excessively small radii for the inner surfaces 5 and 11 of the walls 3 and 4.

Figure 2:
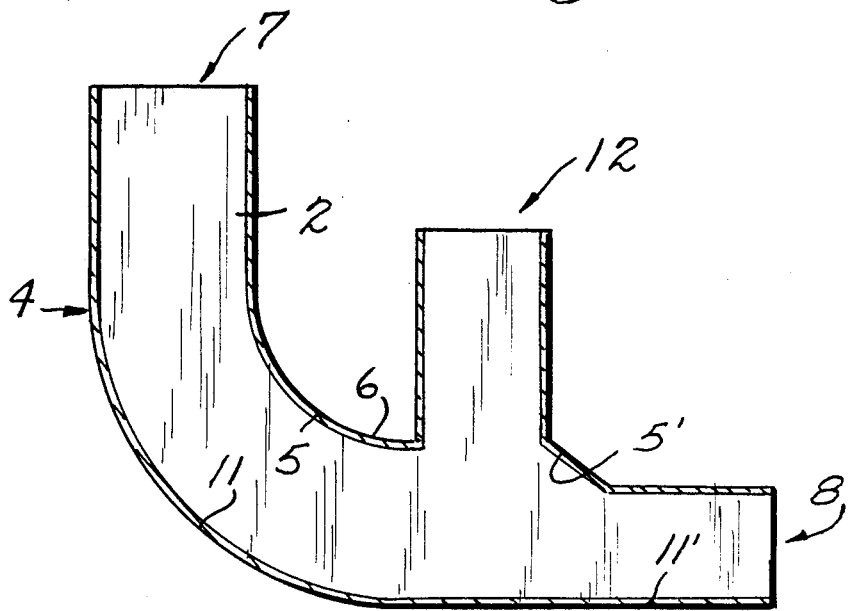

It will be understood that although FIGS. 1 and 2 show the flow conduit 2 spanning 90° it alternatively may span, for example, 180° or 60° and may have a range of radii. Specifically, it has been found that the perpendicular distance between the inner surfaces 5 and 5' of the inner wall 3 and the inner surfaces 11 and 11' of the outer wall 4 is directly proportional to acceptable airflow velocity. In particular, for the preferred range of (average) air velocity at the input portal 8 of 5000 to 6000 feet per minute, the preferred ratio of the perpendicular distance between the inner surfaces 5 and 5' and the inner surfaces 11 and 11',to the radii of those surfaces, is between 2/5 and 2/3 , for a degassification elbow 1 that spans 90°.

Similarly, although FIGS. 1 and 2 show the flow conduit 2 having a substantially rectangular cross-section, it will be understood that other cross-sectional shapes may be used, such as circular or oval. If, for example, input portal aspet ratio is defined as the ratio of (i) the perpendicular distance between surfaces 5 and 11 to (ii) the perpendicular distance between further walls 10, then there are preferred input portal aspect ratios. It has been found that preferred input portal aspect ratio is a function of some of the characteristics of the fibers being conveyed (such as their density, size and tendency to aggregate) and of aggregates of such fibers (such as the softness, smoothness and density of such aggregates). A preferred range of input portal aspect ratios is between 1 and 2. In that range the higher ratios are preferred because at such ratios there are fewer fibers or aggregates of fibers in the portion of the airstream which may well go into either the exhaust portal or the output portal. It will be understood that the practical limit of the input portal aspect ratio is reached when the frictional forces from the inner surfaces of the wall 4 of the flow conduit 2 decrease the momentum of the fibers in the direction of the output portal 8.

Inner surfaces 5, 5', 11 and 11' of each of the walls 3 and 4 of the flow conduit 2 of the degassification elbow 1 may be substantially parallel or, in order to further facilitate the removal of the fluid portion of a solid-fluid mixture, inner surfaces 5' and 11' of each of the walls 3 and 4 of the flow conduit 2 may converge or diverge along the length of the flow conduit 2 in a direction extending form the exhaust portal 9 toward the output portal 8.

The degassification elbow 1 may further comprise exhaust conduit means 12 extending outwardly from the flow conduit 2 at the exhaust portal 9. Such exhaust conduit means 12 may be substantially perpendicular to the inner wall 3 of the flow conduit 2. It has been found that disposing such exhaust conduit means 12 substantially perpendicular to the inner wall 3 of the flow conduit 2 largely avoids fibers collecting in the flow conduit 2 near the exhaust portal 9. It will be understood that the exhaust conduit means 12 may be disposed other than perpendicularly to the inner wall 3 of the flow conduit 2, provided that the transition edges between the inner wall 3 and the exhaust conduit means 12 are smooth and of sufficient radius that the mineral fibers will not hang across the transition.

The degassification elbow 1 may be used to remove a portion of a gas stream, for example air, which is pneumatically conveying mineral fibers in the flow conduit 2, without substantially affecting the consistency of the rate of flow of the mineral fibers or losing significant quantities of mineral fibers into the exhausted gas stream. It may be used to reduce the volume of air per unit time that feeds such mineral fibers through ducts without substantially reducing the volume of such m1neral fibers fed per unit time through such ducts.

It will be understood that it is largely pressure differences that are used to move air through the exhaust portal 9 and that it is largely the momentum of the mineral fibers that is used to move them from one end to the other of the degassification elbow 1. It will therefore be further understood that in all cases the static pressure is higher at the input portal 7 than it is at or downstream of the exhaust portal 9. Of course, once air and mineral fibers are in the flow conduit 2 they can be slowed, for example by increasing the distance between the inner surfaces 5 and 11 or 5' and 11' such that their kinetic energy is converted to heat and potential energy, and it will thereafter be their momentum that carries them through the remainder of the flow conduit 2.

Fluid removed through the exhaust portal 9 may be directed through exhaust conduit means 12. Such exhaust conduit means 12 may be connected to another conduit, so as to allow the reintroduction of that fluid into the flow conduit 2 or to introduce it into still another conduit.

To increase concentration of solids in the mixture nearer the inner surfaces 11 and 11' of outer wall 4 than to the inner surfaces 5 and 5' of the inner wall 3 does not require as great a pressure gradient along the flow conduit 2, or as large velocities of the solids and fluid, for downward flow as it does for upward flow, since gravitational forces largely add to, rather than detract from, momentum of the fibers and forces from the pressure gradient. Consequently, in using the degassification elbow 1 it is generally preferable to orient the input portal 7 above the exhaust portal 9 and the output portal 8, rather than to orient the output portal 8 above the exhaust portal 9 and the input portal 7.

Moreover, if mineral fibers to be conveyed through the flow conduit are forced into the air stream in order to pass from the inner surfaces 5 and 5' of the inner wall 3 to the inner surfaces 11 and 11' of the outer wall 4 some of them would instead be conveyed through the exhaust portal 9. Therefore, an orientation of the degassification elbow 1 that does not result in such movement of fibers between the inner surfaces of the walls 3 and 4 is preferred over orientations which result in such movement. In such preferred orientations inner wall 3 and outer wall 4 are substantially vertical upstream of exhaust portal 9 and substantially horizontal downstream of exhaust portal 9. Alternatively, the degassification elbow 1 may preferably be oriented for use such that the input portal 7, exhaust portal 9 and output 8 are in substantially the same substantially horizontal plane.

It will be obvious to those skilled in the art that the scope of the present invention is not restricted to the embodiments disclosed above, but may instead be varied within the scope of the following claims without departing from the spirit and scope of the invention.

I claim:

1. A process for removing a fluid from a fibrous solid-fluid mixture, comprising the steps of establishing in a flow conduit having an input portal in a first leg, an output portal at the opposite end of said conduit in a second leg, a smoothly radiused transition portion between said first and second legs, and an exhaust conduit disposed in the inner wall of the second leg of said flow conduit between said input and output portals, said exhaust conduit having a smoothly radiused transition with the downstream portion of the second leg, a pressure gradient as between a higher pressure near an outer wall of said flow conduit and a lower pressure near an inner wall of said flow conduit in the region of said exhaust conduit, introducing said mixture into said input portal of said conduit at a fluid velocity of 5000–6000 feet per minute, conveying said mixture through said flow conduit from said input portal to said output portal past said exhaust conduit such that different velocities of the fluid and solid result in an increased concentration of solids in the portion of said mixture near said outer wall, removing a portion of said mixture that substantially comprises fluid through said exhaust portal, and conveying the reminder of said mixture through the remainder of said flow conduit and through said output portal.

2. A process as claimed in claim 1 wherein said fluid is comprised substantially of air and said fibrous solid is comprised substantially of mineral fibres.

3. A process as claimed in claim 1, wherein said portion of said mixture is comprised substantially of air.

4. A process as claimed in claim 1 wherein said input portal is above said output portal.

5. A process as claimed in claim 1, wherein said output portal is above said input portal.

6. A process as claimed in claim 1, wherein said input portal and said output portal are in substantially the same horizontal plane.

7. A degassification elbow for separating a fluid component from a fibrous solid-fluid mixture, said elbow comprising a curved flow conduit having an input portal in a straight first leg, an output portal at the opposite end of said conduit in a straight second leg, a smoothly radiused transition portion between said first and second legs, and an exhaust conduit disposed in the inner wall of the second leg of said flow conduit between said input and output portals, said exhaust conduit having a smoothly radiused transition with the downstream portion of the second leg, the arrangement being such that, on passage of the solid-fluid mixture through said conduit from the input to the output portal thereof, a substantially fluid portion of the mixture can be removed through said exhaust portal.

8. A degassification elbow as claimed in claim 7 wherein the inner surfaces of each of said walls are substantially parallel.

9. A degassification elbow as claimed in claim 7 wherein the inner surfaces of each of said walls converge along the length of said conduit in a direction extending from said exhaust conduit toward said output portal.

10. A degassification elbow as claimed in claim 7 wherein the inner surfaces of each of said walls diverge along the length of said conduit in a direction extending from said exhaust conduit toward said output portal.

11. A degassification elbow as claimed in claim 7 wherein said exhaust conduit means is substantially perpendicular to said inner wall.

* * * * *

UNITED STATES PATENT AND TRADEMARK OFFICE
CERTIFICATE OF CORRECTION

PATENT NO. : 4,971,604

DATED : November 20, 1990

INVENTOR(S) : Mark B. DOCKRILL

It is certified that error appears in the above-identified patent and that said Letters Patent is hereby corrected as shown below:

On the title page, under item [19], change "Dockrell" to --Dockrill-- and in item [75], change "Inventor: Mark B. Dockrell" to --Inventor: Mark B. Dockrill--.

Signed and Sealed this

Ninth Day of June, 1992

*Attest:*

DOUGLAS B. COMER

*Attesting Officer*      *Acting Commissioner of Patents and Trademarks*